(12) United States Patent
Dykes et al.

(10) Patent No.: US 6,951,905 B2
(45) Date of Patent: Oct. 4, 2005

(54) BISOXAZOLONE BASED POLYMERS

(75) Inventors: Louise Dykes, Farnborough (GB); Simon Lane, Farnborough (GB)

(73) Assignee: Qinetiq Limited, Hants (GB)

( * ) Notice: Subject to any disclaimer, the term of this patent is extended or adjusted under 35 U.S.C. 154(b) by 268 days.

(21) Appl. No.: 10/182,333

(22) PCT Filed: Jan. 16, 2001

(86) PCT No.: PCT/GB01/00157

§ 371 (c)(1),
(2), (4) Date: Oct. 18, 2002

(87) PCT Pub. No.: WO01/55244

PCT Pub. Date: Aug. 2, 2001

(65) Prior Publication Data

US 2003/0158349 A1 Aug. 21, 2003

(30) Foreign Application Priority Data

Jan. 26, 2000 (GB) ............................... 0001626
Nov. 2, 2000 (GB) ............................... 0026801

(51) Int. Cl.$^7$ ............................................. C08G 73/06
(52) U.S. Cl. .............................. 525/328.3; 525/328.4; 525/329.1; 525/329.3; 525/540; 528/407; 528/424
(58) Field of Search .............................. 525/540, 328.3, 525/328.4, 329.1, 329.3; 528/407, 424

(56) References Cited

U.S. PATENT DOCUMENTS 4,291,152 A 9/1981 Inata et al.

FOREIGN PATENT DOCUMENTS

JP 55-160025 * 12/1980
JP 56-79129 * 6/1981

OTHER PUBLICATIONS

Acevedo et al; "Study of Bulk Chain Coupling Reactions. I. Reaction Between Bisoxazolones and Amine–Terminated Polyamide 12"; Journal of Polymer Science: Part A; Polymer Chemistry, US, John Wiley and Sons; vol. 31, 2993, pp. 817–830, XP00965584.

Acevedim et al; "Study of B Bulk Chain Coupling Reactions. I. Reaction Between Bisoxazolones and Amine–Terminated Polyamide" Synthesis of Polyether–Block–Polyamides; Journal of Polymer Science, Polymer Chemistry Edition, US, John Wiley and Sons, New York, vol. 31, No. 6, May 1, 1993, pp. 1579–1588, XP00398502.

* cited by examiner

*Primary Examiner*—Ana Woodward
(74) *Attorney, Agent, or Firm*—Nixon & Vanderhye P.C.

(57) ABSTRACT

A method of preparing an elastomeric polymer comprising the step of reacting a bisoxazolone with a primary or secondary di-amine terminated oligomer. Also disclosed is a polymer having the formula comprising the repeat unit (I), where $R_1$, $R_2$, $R_3$ and $R_4$ can be any alkyl or aryl groups and $R_5$ the amine terminated oligomer

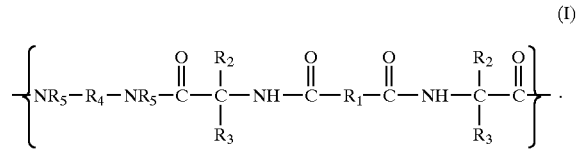

(I)

2 Claims, No Drawings

BISOXAZOLONE BASED POLYMERS

This application is the U.S. national phase of international application PCT/GB01/00157 filed 16 Jan. 2001, which designated the U.S.

At present many materials are based on polyurethanes, which offer considerable versatility. They can be processed by almost all known manufacturing techniques and their properties can be varied to give a wide range of strengths and stiffnesses by modifying any of the three main building blocks of their structure: diisocyanates (rigid block), polyols (flexible block) and chain extenders (may be flexible or rigid). Chain extenders may be amino alcohols, tertiary nitrogen-containing diols, polyols or diamines and can permit cross-linking if more than two reactive groups are present.

The usual route for synthesis of cross-linked thermoplastic polyurethanes involves an initial mix of two equivalents of diisocyanate and one equivalent of diol to produce a relatively stable prepolymer that contains an isocyanate end group. That then reacts with a slight molar deficiency of chain extender resulting in the 'final' polymer possessing a small excess of NCO groups. A period of heating is required to activate the NCO groups. They are then able to contribute towards branching and crosslinking reactions and hence the modulus of the polyurethane elastomer. A period of heating may be required to obtain a useful reaction rate.

Alternatively the polyol, isocyanate and chain extender can be mixed together in a one-shot process. The chain extender influences the elastomeric properties of the resulting polymer. When a diamine is employed as a chain extender urea linkages are introduced which may contribute to strong hydrogen-bonded interactions. They are more commonly used with unsymmetrical diisocyanates and methylene-diisocyanates. These isocyanates are bulky, hindered structures.

The isocyanates most frequently used are 2,4- and 2,6-toluene diisocyanate (TDI) and 4,4-diphenylmethane diisocyanate (MDI). TDI is usually in the form of 80/20 mixture of the 2,4- and 2,6-isomers or 100% of the 2,4-isomer. MDI can be in the 'pure' form or in a liquid form due to the presence of an isomer mixture or dimers or trimers).

The synthesis of the isocyanate systems with amine nucleophiles is relatively inexpensive and capable of large scale manufacture. The nucleophilic addition rate is very high and no small molecule is liberated that would need to be removed from the system.

Some polyurethanes have a two-phase structure in which rigid segments separate forming defined areas within a matrix of soft segments. The areas of rigid segments form physical crosslinking sites and are held together by Van der Waals and hydrogen bonded interactions. Therefore with increasing rigid segment content there is an increase in modulus and tensile strength. Strain-induced crystallisation can also occur in the soft segments due to stretching and disentanglement while the rigid segments remain ordered transverse to the direction of stretching. This can also lead to a high modulus. Microphase separations are observed from the aggregation of rigid segments or from strain induced crystallisation mentioned above. Increased degrees of crosslinking will reduce the amount of crystallinity possible.

There are however a number of significant problems with the polyurethane system such as the toxicity of the isocyanates. They are well known for causing permanent respiratory sensitisation and other serious health problems mainly connected to the respiratory system. Also, due to the hydrolytic instability of the isocyanates, the processing conditions must be scrupulously anhydrous as the presence of water will result in foaming. The occurrence of side reactions and premature cross-linking all results in wasteful products.

Isocyanates can also self condense to form dimers that can lead to unwanted side reactions and therefore tile correct stoichiometry of the reactants is no longer known. Another problem, due to the reactivity of the isocyanates, is that the urethane produced can react further with the isocyanate. This results in urea, allophanate and biuret linkages that again can lead to undesired cross-linking.

It is an object of the invention to provide for a method of producing polymers having desirable characteristics but avoiding the use of isocyanates. The inventors has determined that the use of bisoxazolones can produce alternative polymers of comparable properties to commercially available polymers via an alternative and safer route.

Azlactones (or oxazolones) are compounds that can be derived from $\alpha$-amino acids. They can readily undergo ring opening addition reactions with various nucleophiles such as water, alcohols and amines. A whole range of multifunctional azlactones with varying functionalities can be synthesised by manipulating the starting material substituents. Cleaver and Pratt first investigated multifunctional azlactones in 1955 that initiated a lot of interest in this series of compounds. Over more recent years there has been little interest in comparison although the potential for their use had been recognised. Acevedo and Fradet more recently explored bi-functional azlactones (bisoxazolones) and their use as chain coupling reagents to assist bulk polymerisation with reactive oligomers. The advantages of this system are that it reduces the presence of undesired side reactions and the required reaction time and temperatures are lower than the previous 240° C. (required for several hours) used in systems which did not utilise bisoxazolones when synthesising polyether-block-polyamides. Bisoxazolones however, are not volatile or highly reactive but will react with amine nucleophiles and polyols readily adopting a similar addition reaction. Bisoxazolones are also more moisture tolerant compared to isocyanates. If hydrolysis does occur the product would not react with residual starting material causing undesired cross-linking.

Bisoxazolones are synthesised through a number of steps and various routes have been explored. Their basic structure is built up from amino acids. Few amino acids with suitable functionality can be bought but others can be made. By changing the amino-acid you can change the functionality of the bisoxazolone. The bisoxazolones can react with diamines or diols to produce polyamides.

Cleaver and Pratt polymerised bisoxazolones in chloroform with diamines. Although the polymers tended to be insoluble in the solvent it appeared to 'wet' the surface enough to provide a medium for reaction to occur. They observed the fast reactions and characterised the polymers noting 'stick points', viscosities, solubility and X-Ray diffraction patterns. Ueda et al investigated ring-opening polyaddition of 4,4'disubstituted bisazlactones with various diamines. The resulting polyamides with pendant amide groups were obtained after 24 hours in solution. Inherent viscosities were analysed and the decomposition noted at 200–300° C. determined by TGA and DTA. A further publication by Ueda experimented with 2,2'-p-phenylenebis-5-oxazolone (PBO) to give polyamides. Introducing the phenyl group at the C4 position was thought to increase the thermal stability of the resulting polyamides. They proceeded in producing a series of polyamides from this monomer (PBO) to compare their properties. Their findings showed no significant changes in thermal stability when using different combinations of monomers, however the solubility was outstanding in a wide range of solvents. Rasmussen et al also polymerised bisazlactones with polyols and polyamines such as polyethertriamine and glycerol, and they observed reaction times of seconds or minutes. The bisazlactones appeared to be susceptible to nucleophilic attack and much less moisture sensitive compared to isocyanates. Rasmussen et al synthesised more polyimidazolinones from cyclodehydration of polyamides. Some of the reactions required the presence of a catalyst such as carboxylate salts. Rasmussen et al was also responsible for a publication in the Encyclopaedia of Polymer Science in which they reviewed polyazlactones. They described structure properties, chemical and physical properties of oxazolones, bisoxazolones and alkenyl azlactones. A thorough account of the findings in this field to date was undertaken.

Other research groups have looked into bisoxazolone synthesis with various applications. More recently a French group synthesised bisoxazolones using established techniques, Acevedo and Fraget as mentioned earlier. A series of chain coupling reactions between amine terminated oligomers and bisoxazolones were carried out in the melt producing polyether-block-polyamides. They adopted both a one and two shot reaction. In the two shot reaction the bisoxazolone initially reacted with an amino propyl terminated polyethylene glycol (PE) and then a diamino polyamide-12 oligomer (PA) was added. The reaction temperature was 200° C. By making a prepolymer, side reactions that had occurred previously causing the synthesis of lower molecular weight polymers were eliminated.

The inventor has established that diisocyanates used in conventional polyurethanes can be replaced with bisoxazolones to give analogous polyamide materials. The use of bisoxazolones instead of isocyanates could eliminate all the health and safety problems mentioned above. Potentially many different bisoxazolones can be synthesised and a number have already been made. By incorporating different bisoxazolones into this system the properties of the resulting polyamides can be designed.

The invention comprises a method of preparing an elastomeric polymer comprising the step of reacting a bisoxazolone with a di-amine terminated oligomer, wherein said step is carried out in a solvent at a temperature less than 80° C.

The bisoxazolone maybe reacted with either a primary or secondary di-amine terminated oligomer. Preferably, the reaction is carried out at room temperature.

The invention also consists of a polymer having the formula comprising the repeat unit:

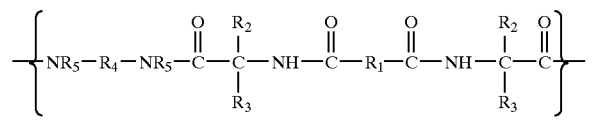

Where $R_5$ is H for a primary amine and an alkyl or aryl for a secondary amine.

The invention will now be described with reference to various examples. The inventors have characterised a number of bisoxazolones which have been determined to be useful as reactant in producing polymeric materials. Different bisoxazolones can be synthesised by varying the functionality of some of the chemicals used in intermediate steps.

The synthesis of bisoxazolones and other multiazlactones is well documented. A number of different synthetic routes have been utilised containing different intermediates which result in producing a series of bisoxazolones varying the functional groups $R^1$, $R^2$ and $R^3$ of the general formula below.

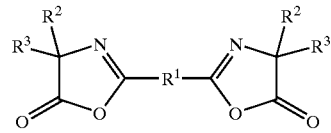

The functionality of the amino acid used determines the resulting functionality of the bisoxazolone at the C4 position. Also in the amidation procedure different acid chlorides can be used which vary the length and functionality of the chain joining the two five membered rings in the bisoxazolone.

A blend of bisoxazolones can be used as this should create a melting point, which is lower than the either of them on their own.

Bisoxazolones have been referred to in many papers as being more hydrolytically stable when compared to isocyanates. The bisoxazolones focused on in the series will be the ones with a longer 'shelf-life' and will therefore be more stable. This may be more probable with structures containing a longer chain linking the two rings or asymmetry. Reacting the bisoxazolones with the amines would produce a series of polyamides. It is hoped that a fraction of these polymers will have potential for further development with their properties (chemical and physical) being comparable with elastomeric polyurethanes. (Properties noted in the specification). The longer term aims are to be able to control the cure rate so that the polyamide can be processed on a large scale using a simple moulding technique, spraying the material or reaction injection moulding (RIM).

The inventor has investigated the use of a number of bisoxazolone as reagents according to the above formulae having the following side groups:

$R^1$ is $—(CH_2)_2—$, $—(CH_2)_4—$, $—(CH_2)_8—$, $—(CH_2)_2—$, 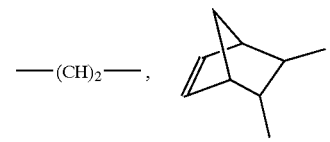

$R^2$ and $R^3$ are $—CH_3$, $—C_4H_9$, 

The bisoxazolones used in the investigation of their use as a reagent are listed above. It should be noted that the invention is not limited to this and various bisoxazolones could be made by varying the intermediates during the synthesis. These were prepared by using the Bucherer-Bergs technique. Four acid chlorides were selected: succinyl chloride.adipoyl chloride. sebacoyl chloride and fumaryl chloride. Three amino acids were chosen: 1-aminocyclohexane carboxylic acid, 2-aminoisobutyric acid and dibutyl amino acid synthesised. Thus 12 bisoxazolones were prepared.

Each of the bisoxazolones mentioned above were reacted with a primary amine terminated oligomer (or elastomeric amino telomer) or a secondary amine terminated oligomer to form a polymer. The primary amines investigated are listed below in examples 1 to 4:
a) Poly(propylene glycol)-block-poly(ethylene glycol)-block-poly(propylene glycol) bis(2-amino propyl ether)

$CH_3CH(NH_2)CH_2[OCH(CH_3)CH_2]_l(OCH_2CH_2)_m[OCH_2CH(CH_3)]_nNH_2$ b) Poly(1,4butane diol) bis (4-aminobenzoate)

$H_2NC_6H_4CO_2C[(CH_2)_4O]_xCOC_6H_4NH_2$ c) Polytetrahydrofuran bis(3-amino propyl) terminated $H_2N(CH_2)_3[O(CH_2)_4]n\ O(CH_2)_3NH_2$ d) Poly(acrylonitrile-co-butadiene), amine terminated $H_2N(CH_2CHCN)_x(CH_2CH=CHCH_2)_yNH_2$ All the oligomers listed above have the basic formula
$H_2N-R^4-NH_2$
Where $R^4$ is for a) $CH_3CHCH_2[OCH(CH_3)CH_2]_l(OCH_2CH_2)_m[OCH_2CH(CH_3)]_n-$ b) $-C_6H_4CO_2[(CH_2)_4O]_xCOC_6H_4-$
c) $-(CH_2)_3[O(CH_2)_4]n\ O(CH_2)_3-$
d) $-(CH_2CHCN)_x(CH_2CH=CHCH_2)_y-$.

So the reaction for a primary amine proceeds as follows:

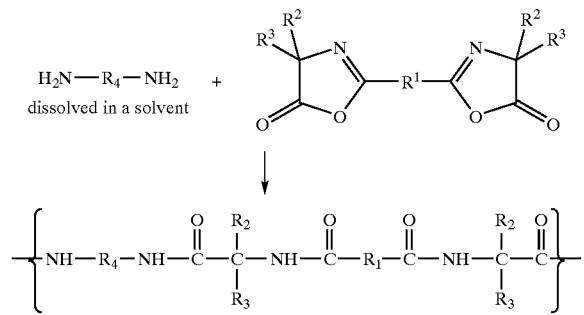

EXAMPLE 1
Synthesis of Polymer from poly(acrylonitrile-co-butadiene), amine terminated with 1,2 ethylene 2,2-bis(4,4-dimethyl-4(5H)-oxazolone).

Where $R^1$ is $-(CH_2)_2-$
$R^2$ is $-CH_3$
$R^3$ is $-CH_3$
$R^4$ is $-(CH_2CHCN)_x(CH_2CH=CHCH_2)_y-$.

0.05 moles of an amine-terminated oligomer were dissolved in 200 mls ethanol-free chloroform in a round bottomed flask. An equimolar amount of bisoxazolone was added to this, the flask stoppered and shook vigorously. The reaction mixture was left for 24 hours at room temperature and then a sample was removed for Fourier Transform Infra Red (FTIR) analysis. The reaction mixture was left for a further 24 hours and another sample was removed for FTIR analysis. If any bisoxazolone was still present a 5% excess of amine was added to the mixture. This monitoring process was repeated until the FTIR traces showed the reaction had gone to completion and no bisoxazolone was present. The brown opaque solution was poured into a mould and left at room temperature allowing the solvent to evaporate. The final polymer was opaque and toffee coloured and elastomeric. Characterisation showed a high molecular weight polymer had been produced.

EXAMPLE 2
Synthesis of Polymer from Polytetrahydrofuran bis(3-amino propyl) Terminated with 1,2 ethylene 2,2-bis(4-dicyclohexyl-4(5H)-oxazolone).

Where $R_1$ is $-(CH_2)_2-$
$R^2$ and $R^3$ is

$R^4$ is $-(CH_2)_3[O(CH_2)_4]nO(CH_2)_3-$ 0.05 moles of an amine-terminated oligomer was dissolved in 200 mls ethanol-free chloroform in a round bottomed flask. An equimolar amount of bisoxazolone was added to this, the flask stoppered and shook vigorously. The reaction mixture was left for 24 hours at room temperature and then a sample was removed for FTIR analysis. This monitoring process was repeated until the FTIR traces showed the reaction had gone to completion and no bisoxazolone was present. The clear, colourless solution was poured into a mould and left at room temperature allowing the solvent to evaporate. The final polymer was transparent and colourless and elastomeric. Characterisation showed a high molecular weight polymer had been produced.

EXAMPLE 3
3. Synthesis of Polymer from Poly(1,4-butane diol) bis (4-aminobenzoate) with 1,8 octylene 2,2-bis(4-dicyclohexyl-4(5H)-oxazolone).

Where R1 is $-(CH_2)_8-$
$R^2$ and $R^3$ is

$R^4$ is $-C_6H_4CO_2[(CH_2)_4O]_xCOC_6H_4-$ 0.05 moles of an amine-terminated oligomer was dissolved in 200 mls ethanol-free chloroform in a round bottomed flask. An equimolar amount of bisoxazolone was added to this, the flask stoppered and shook vigorously. The reaction mixture was left for 24 hours at room temperature and then a sample was removed for FTIR analysis. This monitoring process was repeated until the FTIR traces showed the reaction had gone to completion and no bisoxazolone was present. The transparent orange solution was poured into a mould and left at room temperature allowing the solvent to evaporate. The final polymer was transparent and orange. Characterisation showed a high molecular weight polymer had been produced.

EXAMPLE 4
Synthesis of Polymer from Poly(propylene glycol)-block-poly(ethylene glycol)-block-poly(propylene glycol) bis(2-amino propyl ether) with 1,4 butylene 2.2-bis(4,4-dimethyl-4(5H)-oxazolone).

Where $R^1$ is $-(CH_2)_4-$
$R^2$ is $-CH_3$
$R^3$ is $-CH_3$ $R^4$ is $CH_3CHCH_2[OCH(CH_3)CH_2]_l(OCH_2CH_2)_m[OCH_2CH(CH_3)]_n-$ 0.05 moles of an amine-terminated oligomer were dissolved in 200 mls ethanol-free chloroform in a round bottomed flask. An equimolar amount of bisoxazolone was added to this, the flask stoppered and shook vigorously. The reaction mixture was left for 24 hours at room temperature and then a sample was removed for FTIR analysis. The reaction mixture was left for a further 24 hours and another sample was removed for FTIR analysis. If any bisoxazolone was still present a 5% excess of amine was added to the mixture. This monitoring process was repeated until the FTIR traces showed the reaction had gone to completion and no bisoxazolone was present. The colourless solution was poured into a mould and left at room temperature allowing the solvent to evaporate.

The secondary amine terminated reactions investigated are listed below:

EXAMPLE 5

Synthesis of Polymer from Poly(acrylonitrile-co-butadiene), amine Terminated with 1,2 ethylene 2,2-bis(4,4-dimethyl-4 (5H)-oxazolone).

Where $R^1$ is —$(CH_2)_2$—
$R^2$ is —$CH_3$
$R^3$ is —$CH_3$
and the oligomer ($R_4$) is $R_5$—$(CH_2CHCN)_x$ $(CH_2CH=CHCH_2)_y$—$R_5$ where $R_5$ is

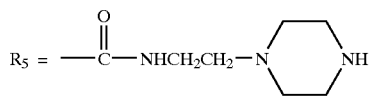

0.05 moles of an amine-terminated oligomer were dissolved in 200 mls ethanol-free chloroform in a round bottomed flask. An equimolar amount of bisoxazolone was added to this, the flask stoppered and shook vigorously. The reaction mixture was left for 24 hours at room temperature and then a sample was removed for Fourier Transform Infra Red (FTIR) analysis. The reaction mixture was left for a further 24 hours and another sample was removed for FTIR analysis. If any bisoxazolone was still present a 5% excess of amine was added to the mixture. This monitoring process was repeated until the FTIR traces showed the reaction had gone to completion and no bisoxazolone was present. The brown opaque solution was poured into a mould and left at room temperature allowing the solvent to evaporate.

The final polymer was characterised using the following methods; FTIR, MDSC, GPC, TGA, DMTA and tensile testing where appropriate.

The reaction for a secondary amine proceeds as follows;

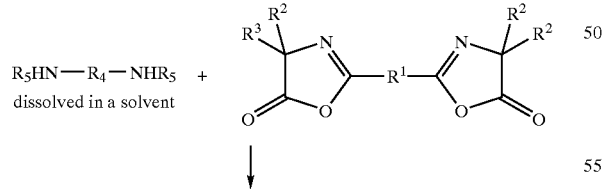

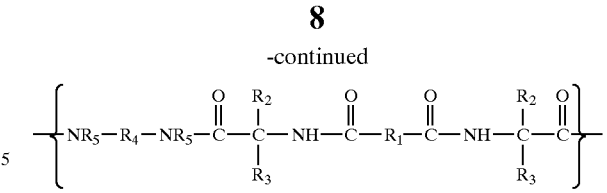

It would be apparent to a person skilled in the art that alternative bisoxazolones and di-amine terminated oligomers could be substituted for those used in the examples given above.

What is claimed is:

1. A method of preparing an elastomeric polymer comprising the step of reacting a bisoxazolone with a di-amine terminated oligomer so as to form the elastomeric polymer, wherein said step is carried out in a solvent at a temperature less than 80° C.

2. A method as claimed in claim 1 wherein said bisoxazolone has the formula:

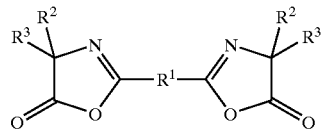

$R^1$ is selected from the group consisting of

—$(CH_2)_2$—, —$(CH_2)_4$—, —$(CH_2)_8$—, —$(CH)_2$—,

$R^2$ and $R^3$ are selected from the group consisting of

—$CH_3$, —$C_4H_9$, and 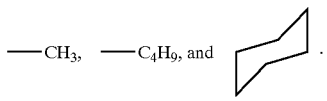

* * * * *